3,692,734
Patented Sept. 19, 1972

3,692,734
PROCESS OF MAKING A RUBBER COMPOSITION FOR ADHERING RUBBERS AND TEXTILES
Erhard Klötzer, Hanau am Main, and Willi Clas, Bruhl-Berzdorf, Germany, assignors to Deutsche Gold- und Silber-Scheideanstalt, vormals Roessler, Frankfurt am Main, Germany
No Drawing. Filed Oct. 10, 1969, Ser. No. 866,143
Claims priority, application Germany, Oct. 12, 1968, P 18 02 761.7
Int. Cl. C08c 11/10; C08d 9/10; C08g 51/04
U.S. Cl. 260—38                    7 Claims

ABSTRACT OF THE DISCLOSURE

A premix is made for incorporation in a natural or synthetic vulcanizable rubber mixture of improved adhesion to textiles by coagulating an aqueous dispersion of finely divided precipitated silicic acid or silicate as a rubber latex and mixing resorcinol and hexamethylenetetramine as resin-forming components into the dry coagulate.

The invention also comprises the vulcanizable premix thus made in which specific amounts of synthetic rubber, silicic acid, resorcinol and hexamethylenetetramine are incorporated.

BACKGROUND OF THE INVENTION

The invention relates to a process for making a vulcanizable rubber premix for improving the adhesion of natural or synthetic rubbers to textiles.

Articles made of rubber which have to withstand considerable dynamic stress, such as vehicle tires, transport ribbons or conveyor belts and driving belts, are usually reinforced with textiles which may be in the form of cord or other fabric textiles. The problem in these cases is to provide as strong an adhesion between the rubber material and the textile reinforcements as possible. The textile may both be a natural fabric as well as synthetic fiber material such as a polyester (Dacron) or a polyamide (nylon or Perlon). Conventionally, the textile fabric is prepared for this purpose by means of a rubber latex and an adhesion promoter such as a phenol formaldehyde condensation product, the phenol usually being resorcinol. These resin components on the one hand enter into reaction with the functional groups of the particular textile material and, on the other hand, with the conjugated elastomer system and thus cause a firm adhesion of the applied rubber layer on the underlying textile fabric.

The adhesion values obtained in this manner, however, do not in all cases meet the high requirements for this type of compound material and efforts have been made to develop improved processes.

Thus, it has been proposed to add both resin-forming components which supply phenols and formaldehydes such as resorcinol or hexamethylenetetramine and, on the other hand, a finely dispersed silicic acid to the elastomer mixture which thus is suited to coat or glaze textiles resulting in an improved adhesion of the otherwise unprepared textiles or threads, for instance cord threads, as between themselves and in relation to the rubber materials (tire treads, conveyor belt, cover slabs, metal fabrics, etc.).

However, one of the resin-forming components, the resorcinol, which is the preferred phenol derivative, is difficult to distribute in the rubber mixture depending to a large extent on the mixing process such as in a kneader or on a roller. It has therefore been proposed to intimately mix the resin-forming components with the fillers (finely divided activated silicic acid and/or silicates) prior to incorporation in the rubber compound. The mixture in this case was accomplished by grinding or by adsorption, for instance application of the resin-forming components in solution in a solvent. This resulted in an easier distribution of the resorcinol in the rubber mixture and thus in a substantially improved adhesion to the textile during the subsequent vulcanization operation.

However, with this process, there is the short-coming that both the resorcinol and the hexamethylenetetramine, as well as the finely distributed pulverulent silicic acid, have a tendency to cause dusting. The developed dust clouds and also the vapors from the resorcinol and hexamethylenetetramine, which are generated during the processing in the kneader, and the ensuing temperatures in excess of 130° C. are apt to constitute a health hazard. This phenomenon also leads to improper dosage because of the loss during the mixing operation due to dusting.

Another proposal therefore has been to employ finely divided white fillers such as silicic acid or silicates in the form of a premix of the filler and the rubber which has the consistency of a loose granulate. This process is intended to avoid the dusting and to accelerate the incorporation of the fillers. The granulate is mechanically strong enough to permit shipping, storing and handling and, on the other hand, will easily disintegrate when incorporated in the rubber or other elastomer and thus will be evenly distributed in the matrix.

The formation of these dry granulate types or pulverulent premixes is effected, for instance, by coagulation of a silicic acid dispersion or by co-precipitation of sodium silicate with the latex dispersion. This then results in the described premixes which then form the basis for making the vulcanizable mixture by adding the remaining components such as the remaining rubber and additives such as fillers, pigments and oil and also vulcanization aids and, further, the resin-forming components such as resorcinol and hexamethylenetetramine which improve the adhesion.

This process results in a definite improvement of the incorporation and distribution of the premix in the rubber latex. However, the thus-obtained final rubber mixtures have the disadvantage that, because of the subsequent addition of the remaining components, the particle structure is not what would be necessary for obtaining an optimum quality of vulcanizate.

The invention has therefore the object to avoid these drawbacks of the prior art and, in particular, to permit an incorporation of a premix in a vulcanization mixture which avoids dusting, permits an easy incorporation and results in a very fine distribution and optimum dosage of the individual mixing components.

SUMMARY OF THE INVENTION

By the method of the invention, an aqueous dispersion of a finely divided precipitated silicic acid or silicate is coagulated with a rubber latex. The mass is then dried and the resin-forming components are mixed into the dry coagulate. The resin-forming components and the dry coagulate are ground together or they may be ground separately and then mixed.

The invention also embraces a premix which has been made by the process just indicated and comprises a synthetic rubber in an amount from 10 to 50 parts by weight, silicic acid in an amount from 8 to 40 parts by weight, resorcinol in an amount from 1 to 5 parts by weight and hexamethylenetetramine in an amount from 0.5 to 3 parts by weight, all parts relative to 100 parts of rubber.

DESCRIPTION OF THE PREFERRED EMBODIMENTS

In a preferred embodiment, finely ground resorcinol and hexamethylenetetramine are added in an amount to provide for a premix which when incorporated in the final vulcanizable mixture will result in optimum adhesion between the textile reinforcement, which does not require special pre-treatment or preparation, and the rubber material. This type of pulverulent non-dusting premix provides for optimum dispersion of the mixing components. Thus, unnecessarily high mixing temperatures which would lead to undesirable evaporation losses and, on the other hand, loss through dusting can be avoided, particularly since the silicic acid, because of the use of the pulverulent premix, will be finely dispersed in all cases in the rubber mixture.

The activated silicic acid may either be a silicic acid that is precipitated from a sodium silicate solution by means of a mineral acid and is in finely distributed amorphous form, or it may be a finely divided powder which is formed by a thermal process. The silicic acid preferably has a specific BET surface between 30 and 400 m.$^2$/g. and a mean primary particle size between 10 and 40 millimicron.

The following example will further illustrate the composition and the making of the premix of the invention, and the following tables will show possible variations of the process and composition.

EXAMPLE

In order to form a coagulate of silicic acid and a rubber latex, 1848 g. of a pulverulent precipitated silicic acid are dispersed for four minutes in 6.8 l. of water at 70° C. and a pH value of 2.5. The dispersion is then adjusted with sulfuric acid which is diluted in the ratio of 1.9 (amounting to a normality between 3 and 3.5) so as to obtain a pH of 2. Subsequently, 11.55 l. water are added, the water having a temperature of 70° C. To this dispersion is then added 9.3 l. of a styrene-butadiene latex corresponding to 2400 g. of rubber and 380 g. of a 10% fatty alcohol-polyglycolether solution and 24 g. of an alkylated styrenephenol base age resistor as for instance "Wingstay V" for the rubber and up to 720 g. of naphthenic mineral oil. The mixture is vigorously stirred for 5 to 8 minutes by means of a high-performance mixer so as to obtain an intimate mixing of the components. During this operation the pH was maintained at a value between 5 and 6.5.

The coagulation takes place at 70° C. After completion of the coagulation, the pH is adjusted to a value between 2 and 2.5 by means of between 3 and 3.5 normal sulfuric acid. The product is completely precipitated in this pH range in this form of an intimate combination with the silicic acid. There results a light, fluocculent product which does not settle and can easily be filtered. After filtration the material is dried in a conventional drying apparatus.

To the dried product there is then added 3.6 weight parts of resorcinol and 1.92 weight parts of hexamethylenetetramine. The mixture is then subjected to fine grinding.

Prior to the grinding, the coagulate was in the form of a granulate of grain size between 1 and 3 mm. The preferred grain size would be 1.5 mm. After grinding the mixed product had a grain size in the range between 0.1 and 0.5 mm.

It is preferred to add the resin-forming components during the grinding of the coagulate. This can be done by adding equal weight parts of superfinely ground resorcinol and superfinely ground hexamethylenetetramine in a continuous operation.

However, it is also possible to subject the coagulate to a separate grinding and separately also to grind the resin-forming components and then to mix the two ground masses.

Another embodiment provides for preparing a solution of the resin-forming components in an organic solvent such as toluene or in water and then adding the solution to the pulverulent coagulate by a spray application prior to further processing. After drying and recovery of the organic solvent, the thus-obtained premix can immediately be used as such.

Table I will furnish a further illustration of the amounts employed in the composition of the premix.

TABLE I

| Mixture components | Optimal amounts, parts | Range of amounts, parts |
| --- | --- | --- |
| Powder premix (batch) consisting of styrene-butadiene rubber latex | 20 | 10.0–50.0 |
| Finely divided silicic acid | 15.4 | 8.0–40.0 |
| Resorcinol, ground to a superfine state | 3.0 | 1.0–5.0 |
| Hexamethylenetetramine, ground to a superfine state | 1.6 | 0.5–3.0 |
| Total: | 40.0 | 19.5–98.0 |

The dosages given in the column for optimal amounts allow for generally determining the desired dosage. For instance, assuming that a rubber mixture for textile coating or friction glazing comprises the following: 100 wt. parts of rubber, 45 wt. parts of filler (this may be carbon black, silicic acid, silicate or inactive filler such as chalk), 3.0 wt. parts of resorcinol and 1.6 wt. parts of hexamethylenetetramine, as well as further additives and vulcanization agents. All these amounts are relative to 100 wt. parts of the elastomer. From this kind of initial composition it is possible to eliminate, for instance 20 wt. parts of elastomer and 15.4 wt. parts of filler and to replace these 35.4 wt. parts which are removed by 40 wt. parts of the premix of the invention to attain to the optimal adhesion value.

The following is a formulation for natural rubber when using a white adhesion mixture including silicate acid:

TABLE II

| | Parts |
| --- | --- |
| Natural rubber (from the bale) | [1] 80 |
| Stearic acid | 3.0 |
| Zinc oxide | 8.0 |
| Chalk | [2] 30.0 |
| Chromium oxide green | 7.5 |
| Titanium dioxide | 5.0 |
| Benzothiazyl-2-cyclohexylsulfenamide | 1.2 |
| Di-orthotolylguanidine | 1.0 |
| Premix of the invention | [3] 40.0 |
| Sulfur | 2.5 |

[1] Instead of 100 parts.
[2] Instead of 45.0, in powdered form.
[3] Pulverulent, nondusting.

Using strips of a width of 3 cm. for testing adhesive of rubber mixtures and untreated nylon layers, the following adhesion values were obtained:

TABLE III

| | Kg. |
| --- | --- |
| With a vulcanization of 30 min. at 134° C. | 55.5–62.5 |
| With a vulcanization of 10 min. at 170° C. | 170°–51.5 |

If the silicic acid and the resin-forming components (resorcinol and hexamethylenetetramine) are added in the above-indicated optimum dosages but are admixed separately, the following adhesion values are obtained:

TABLE IV

| | Kg. |
| --- | --- |
| With a vulcanization of 30 min. at 134° C. | 32–35 |
| With a vulcanization of 10 min. at 170° C. | 170°–52.5 |

As is evident, the improvement of the adhesion is particularly impressive when mild vulcanization conditions prevail.

What is claimed is:
1. The process of making a vulcanizable rubber composition suited to furnish a rubber of improved adhesion to textiles after vulcanization, the said process comprising the steps of coagulating an acidic aqueous dispersion of a finely divided precipitated silicic acid or silicate with a latex of a highly unsaturated rubber, the said latex constituting part of the total rubber used in said composition; causing acid precipitation of said coagulate; drying the precipitate to a light flocculent product; mixing individual phenolic resin forming components with said dry product and grinding the mixture or separately grinding said resin components and dry product prior to said mixing so as to obtain a premix of a grain size below that of said flocculent product, the said rubber, silicic acid and resin components being employed in the following amounts: unsaturated rubber in an amount from 10 to 50 parts by weight, silic acid in an amount from 8 to 40 parts by weight and phenolic resin forming components in a total amount of 1.5 to 8 parts by weight; and finally mixing said premix with the balance of said rubber prior to vulcanizing the rubber composition.

2. The process of claim 1, wherein said phenolic resin forming components compare resorcinol and hexamethylenetetraamine.

3. The process of claim 1, wherein said phenolic resin forming components are added to said coagulate by spraying a solution of the resin forming components onto said coagulate and then drying the resultant mixture.

4. The process of claim 3, wherein said solution of the resin forming components is a solution in an organic solvent or water.

5. The process of claim 3, wherein said resin forming components are resorcinol and hexamethylene-tetraamine and wherein solutions of each are separately sprayed onto the coagulate.

6. The process of claim 1, wherein said aqueous dispersion of said silicic acid or silicate has a pH between 2 and 2.5, said dispersion then being mixed with said rubber latex, and wherein said coagulation is carried out by adding to said latex-dispersion mixture acid at a pH between 5 and 6.5, adjusting the pH of said acid solution to a pH between 2 and 2.5, followed by filtering the mixture after precipitation of the coagulate, drying and finely grinding the precipitated coagulate and adding thereto resorcinol and hexamethylenetetraamine as resin forming components.

7. The process of claim 6, wherein said resorcinol and hexamethylenetetraamine are finely ground prior to their addition to said coagulate.

References Cited

UNITED STATES PATENTS

| | | | |
|---|---|---|---|
| 3,098,837 | 7/1963 | Haxo | 260—41.5 MP |
| 3,298,984 | 1/1967 | Rye | 260—41.5 MP |

FOREIGN PATENTS

| | | | |
|---|---|---|---|
| 530,505 | 9/1956 | Canada | 260—845 |

OTHER REFERENCES

Chem. & Eng. News, Apr. 22, 1968, pp. 40–41.

ALLAN LIEBERMAN, Primary Examiner

U.S. Cl. X.R.

260—41.5 A, 41.5 MP, 765, 845, 846